United States Patent
Göring

(10) Patent No.: US 7,712,593 B2
(45) Date of Patent: May 11, 2010

(54) BICYCLE FREECOASTER HUB

(75) Inventor: Thomas Göring, Karlsruhe (DE)

(73) Assignee: KHE Fahrradhandels GmbH, Karlsruhe (DE)

( * ) Notice: Subject to any disclaimer, the term of this patent is extended or adjusted under 35 U.S.C. 154(b) by 536 days.

(21) Appl. No.: 11/706,689

(22) Filed: Feb. 15, 2007

(65) Prior Publication Data

US 2008/0200290 A1    Aug. 21, 2008

(51) Int. Cl.
*F16D 41/26* (2006.01)
(52) U.S. Cl. .................. 192/64; 192/109 R; 192/110 R
(58) Field of Classification Search ..................... 192/64
See application file for complete search history.

(56) References Cited

U.S. PATENT DOCUMENTS 5,718,315 A * 2/1998 Chen ........................... 192/64
2002/0179394 A1* 12/2002 Wu ............................ 192/64

FOREIGN PATENT DOCUMENTS

GB     2 372 545     8/2002

OTHER PUBLICATIONS

U.S. Appl. No. 12/002,658, filed Dec. 18, 2007; in re: Thomas Göring, entitled Bicycle Freecoaster Hub.

* cited by examiner

*Primary Examiner*—Rodney H Bonck
(74) *Attorney, Agent, or Firm*—Womble Carlyle Sandridge & Rice, PLLC

(57) ABSTRACT

A bicycle hub comprises an axle 5, a first part 7 being seated on the axle 5 and being provided with or connected to a cog 6, a second part 8 being movable relative to the first part 7 in longitudinal and rotational direction of the axle 5, the first part 7 and the second part 8 being in contact with each other via a screw coupling provided by threads 7' and 8', a hub body 11 being arranged around at least the second part 8, the second part 8 being provided with a first cone surface 9, the hub body 11 having a second cone 10 surface formed thereon or connected thereto, wherein the two cone surfaces 9, 10 are engageable for power transmission, and wherein an adjustable stopper mechanism 12 is provided, limiting a gap providing space for an axial movement of the second part 8.

20 Claims, 4 Drawing Sheets

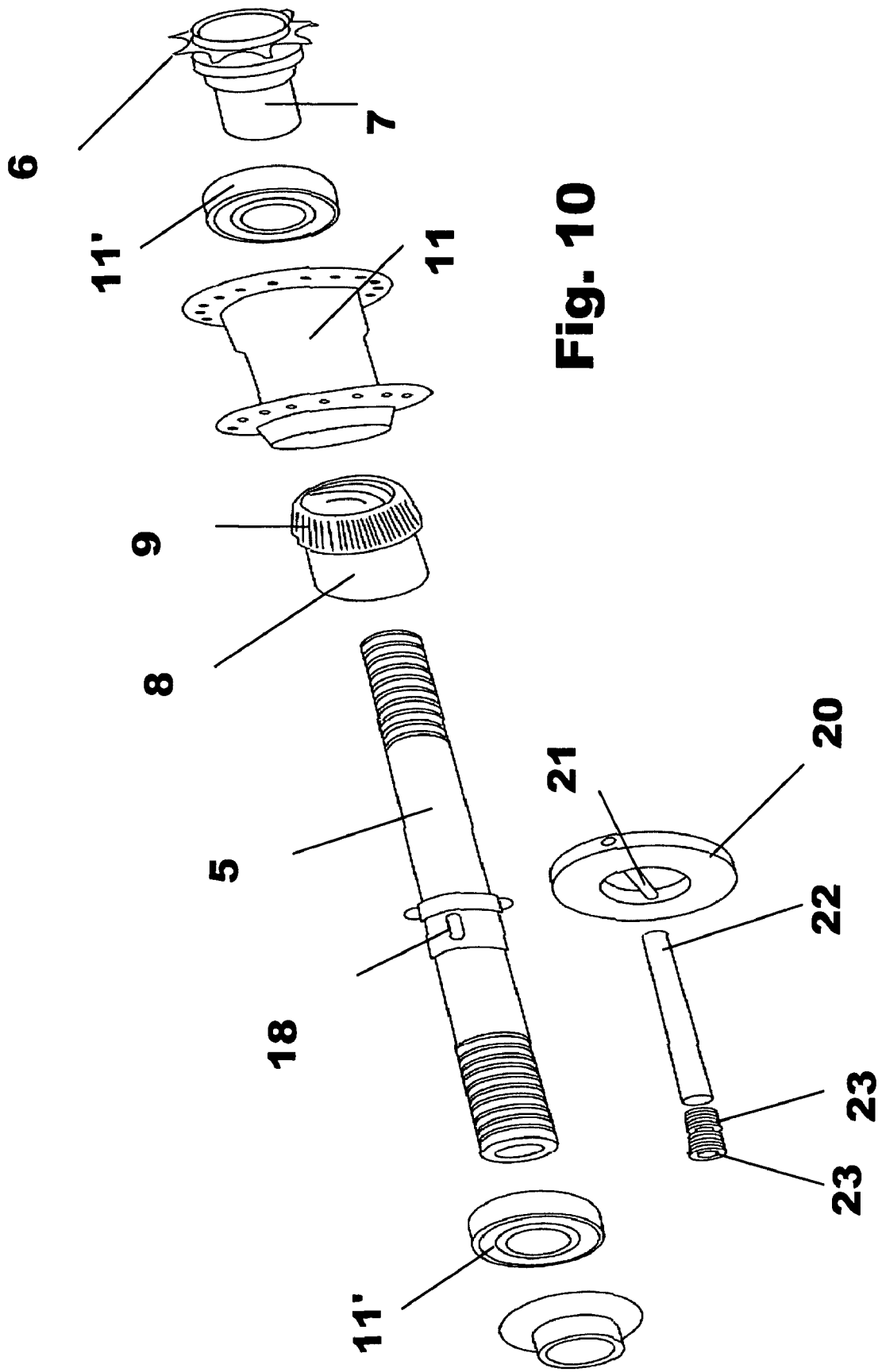

BICYCLE FREECOASTER HUB

BACKGROUND OF THE INVENTION

The present invention relates generally to a bicycle freecoaster hub and, more particularly, to a bicycle freecoaster hub having an adjustable gap so that the response of the hub can be changed.

For doing tricks with BMX freestyle bicycles it is helpful if the response of the hub can be adjusted.

The purpose of adjusting the gap on a freecoaster hub is to change the response/sensitivity of the hub to one's needs. By removing some of the internal gap washers the amount of travel between turning the crank arm and the clutch engaging increases, this also means that when freecoasting backwards there is a greater amount of movement allowed in the cranks before the clutch engages. Also by increasing the amount of internal gap spacers the amount of travel between turning the crank arm and the clutch engaging decreases, this means that when freecoasting backwards there is a lesser amount of movement allowed in the cranks before the clutch engages.

To change the response, the following steps are usually necessary:

1. Disassemble the axle adapter.
2. The sprocket/driver must be removed by turns now.
3. Hold the hub with the side where the sprocket was removed showing upwards. Take a plastic hammer and hit the axle carefully. The axle including the inner parts will come out of the hub shell slowly. Do not take a steel/metal hammer, the axle will be destroyed. The only way getting the axle and the inner parts out of the hub is the former described way. The other way round will destroy parts of the freecoaster.
4. After the axle is removed the bearing must be disassembled. Disassemble the bearing carefully by pulling/pushing it at the inner ring.
5. The delivered spacers can be assembled or assembled spacers can be disassembled now. The more spacer are assembled, the quicker the coaster responds.
6. Reassemble the hub step by step. Take care of the bearings, don't hit the outer ring.

This above-mentioned procedure is quite tiresome, and, further, the hub might be damaged by the disassembling and assembling the hub or by dirt coming inside the hub when assembling. Further, in case the wrong number of spacers is removed or added, or spacers with the wrong thickness are removed or added, the whole procedure has to be repeated until the required response is adjusted.

The UK Patent Application GB 2 372 545 A discloses a bicycle freecoaster hub for BMX bicycles. Said freecoaster hub has a body having mounted thereto an external cone clutch plate which engages with a mating cone clutch plate fixed to a chain driven cog via a clutch driver. When the cog is rotated, by pedaling in a direction to drive the bicycle forward, screw threads on the clutch driver cause matching screw threads on the clutch plate to move the clutch plate axially along the axle into engagement with the clutch plate so as to rotate the hub body. If pedaling stops the clutch plates are disengaged thereby enabling the cog and the hub body to revolve independently of one another so that a rear wheel fixed to the hub body can rotate in either direction without causing a crank and pedals to move. The clutch plates and driver are mounted on the axle in such a way that they may be readily removed without disturbing the hub body or clutch plate. No adjustability of the maximum gap between the cone clutch plates is provided by this assembly.

It is, therefore, a need for an easy change of the maximum gap, being equivalent to the response of a freecoaster hub. It is the objective of the present invention to provide such a freecoaster hub.

SUMMARY OF THE INVENTION

The present invention refers to a bicycle hub comprising: an axle, a first part being seated on said axle and being provided with or connected to a cog, a second part being movable relative to said first part in longitudinal and rotational direction of said axle, said first and said second part being in contact with each other via a screw coupling provided by threads, a hub body being arranged around at least said second part, said second part being provided with a first cone surface, said hub body having a second cone surface formed thereon or connected thereto, wherein said two cone surfaces are engageable for power transmission, wherein an adjustable stopper mechanism is provided, limiting a gap providing space for an axial movement of said second part. Said adjustable stopper mechanism is provided directly within the hub, i.e. no additional parts have to be inserted or no parts have to be removed in case the gap has to be changed.

Said stopper mechanism preferably comprises a positioning element, said positioning element being movable in axial direction of said axle for the purpose of adjusting said gap and thus the response of the hub.

Preferably, said positioning element is seated within the axle, i.e. the axle is at least at one end hollow or having a through bore or being made of a corresponding hollow profile having the required strength. Said positioning element being seated within the axle can be accessed from at least one open end of the axle. Because the positioning element is arranged directly within the axle, this element does not influence the outer arrangement of the hub, in especial, the hub has not to be unmounted for changing the gap because the positioning element can be accessed from one end of the axle. If the outer dimensions of the positioning element are about equivalent to the inner dimensions of the hollow profile of the axle, because the positioning element does not have to be removed but can be positioned by moving in longitudinal direction of the axle, no dirt is introduced inside the axle and, of course, not inside the hub because no disassembling of the hub is required for adjusting the gap.

The positioning element can have a cylindrical shape, i.e. can be formed for example by a rod. Nevertheless any other profile is possible which can be guided within the corresponding opening within the axle.

A very easy and exact adjustment can be reached by a screw moving said positioning element in longitudinal direction. Further, the positioning element can be formed by the screw itself if the end of the screw extends far enough inside. To secure the screw—either if the positioning element is formed by the first screw or if the first screw pushes the positioning element—a second screw can be used being in contact with the first screw.

Preferably, said stopper mechanism comprises an element extending perpendicularly through an opening within the axle. Said opening within the axle is preferably formed by an elongated hole such that the element extending perpendicularly through said elongated hole can move in the longitudinal direction of the axle within said elongated hole. Said element extending perpendicularly through said opening within the axle is in contact with said positioning element, preferably with one end of it, so that the positioning element limits the space within said opening.

Said element extending perpendicularly through said opening within the axle is preferably seated with its ends in a ring being arranged around the axle, so that the position of said ring influences the gap. Preferably, said element is fixed within the ring, e.g. by a screw-coupling, by gluing, by bracing, or by pressing the element in the corresponding openings.

To keep the second part in a concentric relationship to the axle, preferably, a centering device is provided being arranged perpendicularly to the longitudinal direction of the axle and guiding said second part. Preferably, said centering device is provided next to said adjustable stopper mechanism.

The results of such a freecoaster hub are an easy and quick adjustability of the maximum gap and thus of the response of the hub. The adjustment can be done with common tools and without adding or removing of parts from the hub, i.e., for example, no parts like spacers (e.g. washers) can be lost when the maximum gap is increased.

BRIEF DESCRIPTION OF THE DRAWINGS

FIG. 1b is a partly cut view of the pedals, the crankset, a part of the chain and the hub according to the present invention of the BMX bicycle from FIG. 1a.

FIG. 10 is an explosive view of the hub shown in FIG. 1b.

DETAILED DESCRIPTION OF THE PREFERRED EMBODIMENT

Figure 1A:
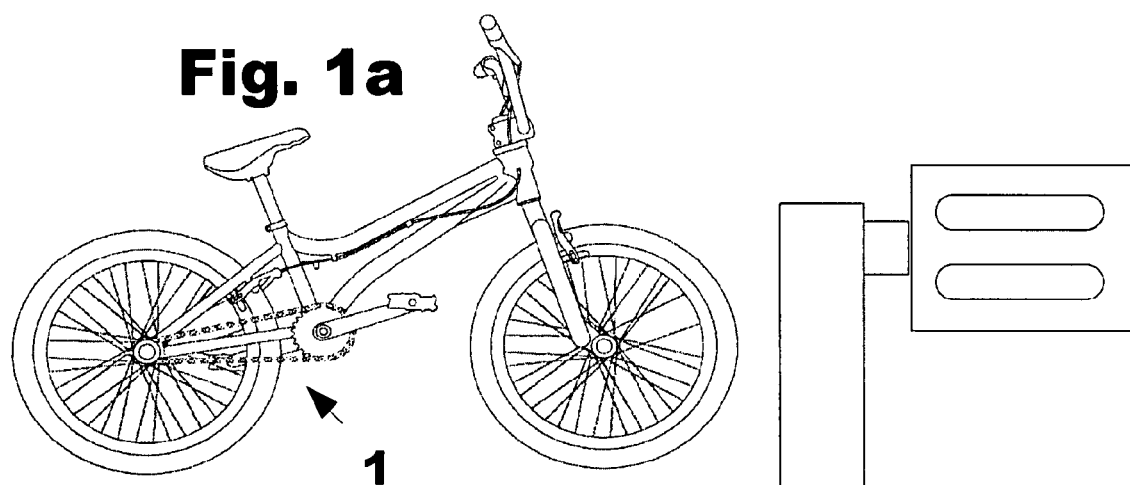
FIG. 1a is a side view of a MBX bicycle.
Figure 1B:
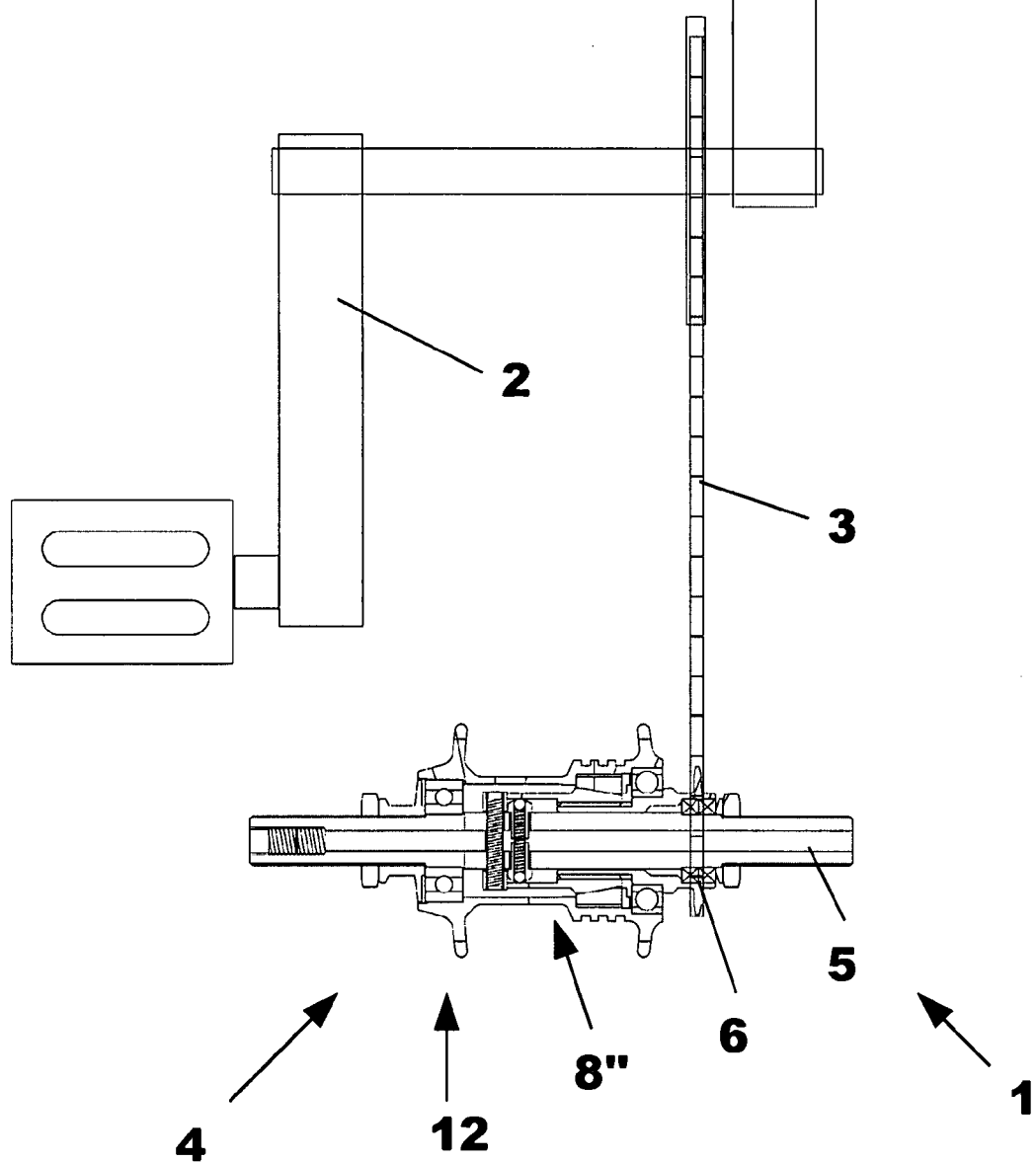

A part of the drive mechanism 1 of a BMX bicycle (see FIG. 1a) is shown in FIG. 1b. This drive mechanism 1 can transmit a power from the rider's legs to the rear wheel (see FIG. 1a) via the pedals, the crankset 2, the chain 3 and the rear hub 4 to the rear wheel. The BMX bicycle has as rear hub 4 a so called freecoaster hub that allows the rear wheel to rotate backwards on an axle 5 without engaging the hub to make the pedals rotate around. This feature is important for the so called flatland BMX riding style.

The axle 5 being used according to the shown embodiment is hollow over the whole length and made of an alloy. Other materials can be used as well, e.g. stainless steel. On the outside of the axle 5 there is seated a cog 6 being formed at one end of a first part 7. The first part 7 has a first external thread 7' on its other end.

In contact with this first external thread 7' there is a second internal thread 8' being provided at one end of a second part 8. On the outside, at the same end of the second part 8 as the thread 8' there is provided an outer cone surface, in the following being referred to as a first inner cone 9. The other end of the second part 8 extends concentrically to the axle 5 having an enlarged inner diameter so that the second part 8 and the axle 5 are not in contact with each other. The second part 8 being arranged in about the middle of the hub 4. The second part 8 is held in the concentric position by a centering device 8" being described later.

The outer cone surface, i.e. the inner cone 9 can engage an outer cone 10. This outer cone 10 is fixed at the inner peripheral surface of a hub body 11 so that no relative movement is possible. Spokes (not shown) extend between and are fixed to the rear wheel and the hub body 11, respectively. The hub body 11 is seated on two bearings 11', one being arranged at every end, and can rotate relative to the axle 5/first part 7. The whole arrangement is sandwiched by two end pieces and fixed by locknuts being mounted on the threaded ends of the axle 5.

Figure 2:
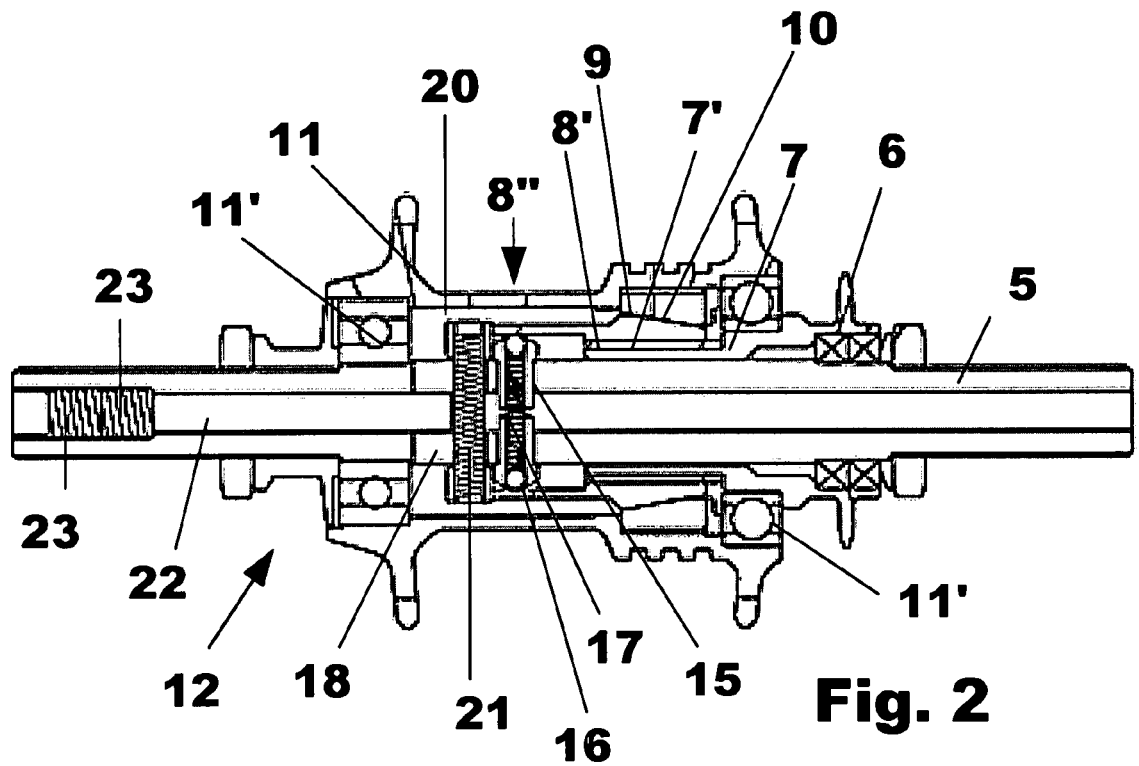
FIG. 2 is a cut view of the hub shown in FIG. 1b, wherein the gap is adjusted to the minimum gap possible.
Figure 3:
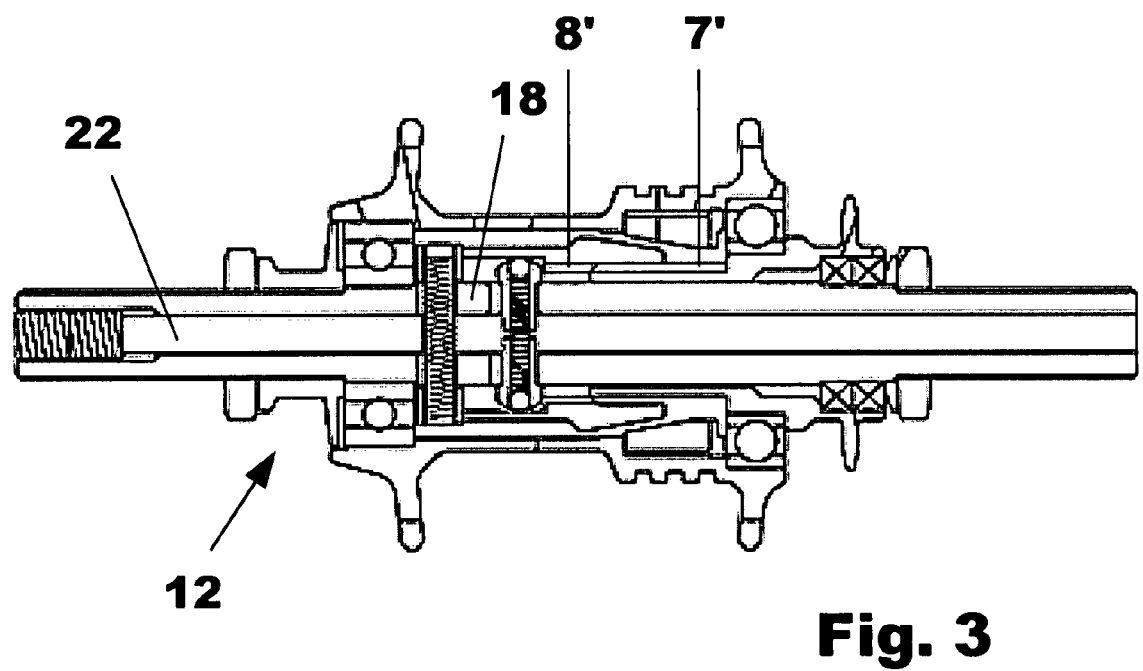
FIG. 3 is a cut view of the hub shown in FIG. 1b, wherein the gap is adjusted to the maximum gap possible.
Figure 4:
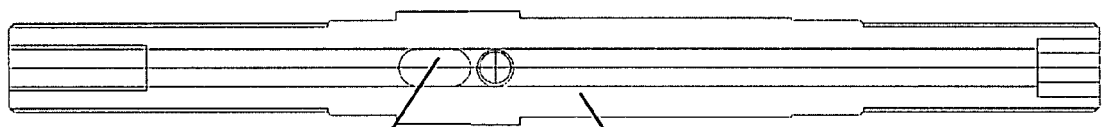
FIG. 4 is a cut view of the axle being used in the hub of FIG. 1b.
Figure 5:
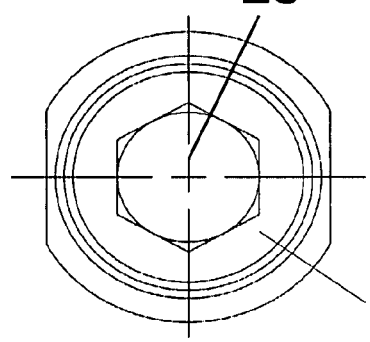
FIG. 5 is a side view as seen from the right side of FIG. 4.
Figure 6:
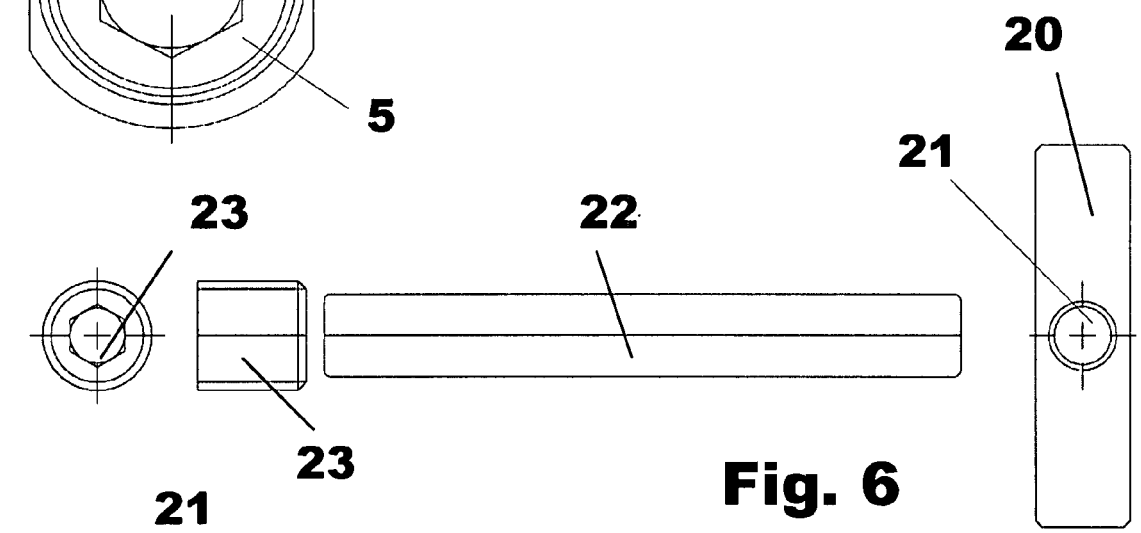
FIG. 6 is an exploded view showing the adjusting mechanism for adjusting the gap as used in the hub of FIG. 1b, wherein on the left side the outer securing headless screw is shown turned.
Figure 8:
FIG. 8 is a view in longitudinal direction of the headless screw being part of the adjusting mechanism shown in FIG. 6.
Figure 9:
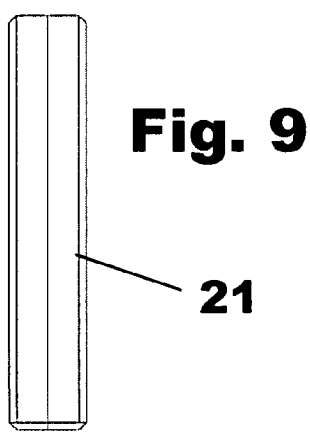
FIG. 9 is another view of the headless screw shown in FIG. 8.
Figure 7:
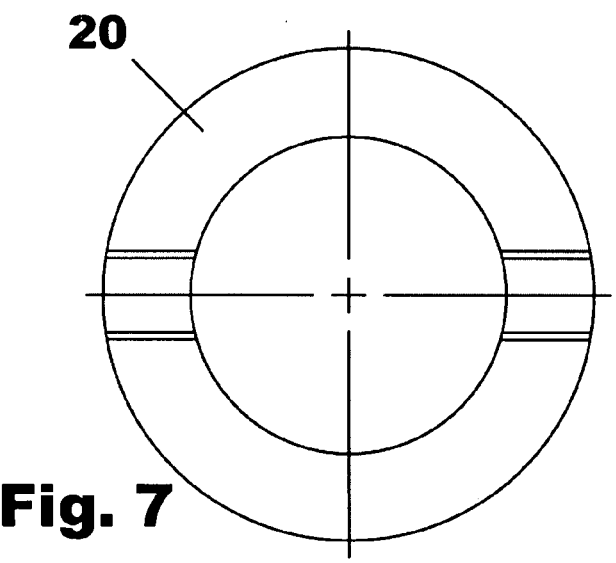
FIG. 7 is a view of a ring being part of the adjusting mechanism shown in FIG. 6.

Further, an adjustable stopper mechanism 12 is provided to adjust the size of a gap. The purpose of adjusting the gap on a freecoaster hub is, as mentioned above, to change the response/sensitivity of the hub to one's needs. The gap according to the present example is formed by the distance the first part 7 can move in longitudinal direction between its two end positions. One end position of the first part 7 (contact on the right side as shown in FIG. 2) is defined by the engagement of the first inner cone 9 with the second outer cone 10. The other end position of the first part 7 (contact on the left side as shown in FIG. 3 which is described later) is defined by the contact of an end surface of the first part 7 and said adjustable stopper mechanism 12 which is described later in detail.

To form the centering device 8", a threaded bore through the axle 5 (i.e. the two opposing walls of the hollow cylinder) is provided, being arranged perpendicularly to the longitudinal direction of the axle 5. Two bushes 15 having broader outer ends and external threads are screwed from outside into each end of said threaded bore. Further, heat treated free balls 16 are seated at the outer ends of the bushes 15. The free balls 16 are pushed outside and in contact with the inner surface of the second part 8 opposite to the thread 8'/cone 9 by a spring 17. The end of the second part 8 keeps the free balls 16 within the openings of the bushes 15. Because of this free ball/spring structure, the second part 8 runs on the rotatable free balls 16 and not on scratching ends of springs or the like. Nevertheless, such a structure using e.g. spring(s) could be used as a centering device for the second part 8 alternatively.

To adjust the gap, i.e. the distance the second part 8 can move in axial direction, the adjustable stopper mechanism 12 is provided. This stopper mechanism 12 comprises in parallel to the above-mentioned threaded bore and extending through both walls of the axle 5 an elongated hole 18 and a ring 20 being arranged around the axle 5 and having a threaded bore extending on both sides of the central axis of the ring 20. Within this threaded bore there is a headless screw 21 screwed inside extending through the elongated hole 18 within the axle 5. Thus, the axial movement of the ring 20 is limited by the elongated hole 18. The outer diameter of the ring 20 equals the outer diameter of the end surface of the second part 8 which can move in axial direction when there is a relative movement between the first part 7 and the second part 8. As can be seen by a comparison of FIGS. 2 and 3, wherein FIG. 2 shows a minimal gap and FIG. 3 shows a nearly maximal gap, the axial movement of the headless screw 21 within the elongated hole 18 can be limited by a positioning element, according to the present example a rod 22, being inserted in the hollow interior of the axle 5 and fixed inside by a pair of headless screws 23, wherein the outer one serves as securing device to make sure, the inner one does not move. The outer diameter of the rod 22 is slightly smaller than the inner diameter of the hollow axle 5 so that the rod 22 can be easily moved in longitudinal direction of the axle 5.

The drive mechanism 1 works as follows:

1. Continuous power transmission from the crankset 3 to the rear wheel rotating forward The movement of the chain 3 is transmitted via the cog 6 and the first external thread 7' being provided on the outside of the first part 7 which is a one piece structure with the cog 6, to the second part 8 being provided with the second internal thread 8' on the inner surface being. On the outside, opposite to the internal thread 8' the first inner cone 9 is situated. The first inner cone 9 is—as shown in FIG. 2—in the situation being described, i.e. power being transmitted to the rear wheel, in direct contact with the inner cone surface of a second outer cone 10 and thus to the hub body 11 at which the outer cone 10 is mounted. By means of a multitude of spokes (not shown) engaging the hub body 11 the rear wheel (not shown) is connected to the hub body 11 as it is well known. Because of the direction of rotation, the first external thread 7' is screwed completely inside the second internal thread 8' such that the second part 8 is pulled to the right as shown in FIG. 2 and that the two cones 9 and 10 are pressed against each other. Because of the direct contact of the two cones 9 and 10 the rotational movement of the first inner cone 9 is transmitted to the second outer cone 10 and thus to the hub body 11 and the rear wheel, i.e. if the rider pedals forward, the rear wheel is turned forward (at least after the cones 9 and 10 are in full contact and transmit the rotation). In case the two cones 9 and 10 are in full contact, the speed of the rear wheel is in a linear dependency on the speed of the crankset 3.

2. Stop of power transmission in combination with continuous forward rotation of the rear wheel In case the rider stops pedaling while continuing to ride ahead, i.e. the bicycle rolls forwards with the rear wheel on the ground, the hub body 11 and the second outer cone 10 being fixed to the hub body 11 continue rotating whereas the cog 6 is no longer driven but stopped (not rotated backwards). Thus, the first inner cone 9 being at the beginning of the stop of pedaling in close contact with the second outer cone 10 continues rotating whereas the cog 6 and, therefore, the first part 7 stop rotating. Because of the relative movement between the first inner cone 9, i.e. the second part 8, and the first part 7 the two parts 7 and 8 are unscrewed at least partly, and, thus, the first inner cone 9 is moved in longitudinal direction (to the left in FIG. 2) until the movement of the first inner cone 9 stops because of not being in touch with the rotating second outer cone 10 anymore and, thus, being no longer driven. I.e. the moment no more rotation is transmitted from the second outer cone 10 to the first inner cone 9, the unscrewing is stopped.

In case of restarting pedaling, first the threads 7' and 8' have to move the two cones 9 and 10 into contact, then, the power is transmitted from the crankset 3 to the rear wheel again. The angle of turning the crankset 3 until the cones 9 and 10 re-engage depends on the chain transmission ratio and the threads 7' and 8' in combination with the gap being available.

3. Backward pedaling

In case the crankset 3 is turned backwards, the disengagement of the two cones 9 and 10 is accelerated and the unscrewing of the two threads 7' and 8' is supported, so that the second part 8 will contact the ring 20, no matter how the adjustable stopper mechanism 12 is set.

Thus, the angle of pedaling forward again after the disengagement is increased to the maximum for the present setting of the gap. In case of the setting shown in FIG. 2 the gap is very small, so that the response is very, very short. In case of the setting shown in FIG. 3 the gap is very big, so that about a whole turn of the crankset 3 is required to restart the power transmission to the rear wheel.

As can be seen from the description above, the axle 5 has not to be hollow over the whole length. A bore reaching to the end of the elongated hole will do. Nevertheless, in case the rod 22 has to be removed, it is easier to push it outside from the other side.

Further, the elongated hole 18 and the threaded bore housing the spring 17 do not have to be arranged in parallel. Any other arrangement is possible, nevertheless, a parallel or perpendicular orientation is preferred. Further, to guide the second part 8 and keep it coaxially to the axle 5 the threaded bore and the elongated hole 18 are close wherein the threaded bore is situated in a position in which it never looses contact to the second part 8.

While the illustrative embodiment of the invention is particularly adapted for use in a BMX bicycle, the inventive concepts are also useful for other types of bicycles and the like. Further, the invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without hereby departing from the scope of the invention. This invention accordingly includes all the means constituting technical equivalents of the means described as well as their combinations.

I claim:

1. A bicycle hub comprising:
    an axle,
    a first part being seated on said axle and being provided with or connected to a cog,
    a second part being movable relative to said first part in longitudinal and rotational direction of said axle,
    said first and said second part being in contact with each other via a screw coupling provided by threads,
    a hub body being arranged around at least said second part,
    said second part being provided with a first cone surface,
    said hub body having a second cone surface formed thereon or connected thereto, wherein said two cone surfaces are engageable for power transmission,
    wherein an adjustable stopper mechanism is provided, limiting a gap providing space for an axial movement of said second part,
    wherein said stopper mechanism comprises a positioning element, said positioning element being movable in axial direction of said axle for the purpose of adjusting said gap, and
    wherein said positioning element is seated within the axle and can be accessed from at least one open end of the axle.

2. A bicycle hub according to claim 1, wherein said positioning element is fixed within said axle by at least one screw being screwed into one end portion of said axle.

3. A bicycle hub according to claim 1, wherein said stopper mechanism comprises an element extending perpendicularly through an opening within the axle.

4. A bicycle hub according to claim 3, wherein said opening within the axle is an elongated hole such that the element extending perpendicularly through said elongated hole can move in the longitudinal direction of the axle.

5. A bicycle hub according to claim 3, wherein said element extending perpendicularly through said opening within the axle is seated with its ends in a ring being arranged around the axle.

6. A bicycle hub according to claim 4, wherein said element extending perpendicularly through said opening within the axle is seated with its ends in a ring being arranged around the axle.

7. A bicycle hub according to claim 6, wherein said element extending perpendicularly through said opening within the axle is provided with threads and screwed with its ends in corresponding threads being provided in two opposing walls of said ring being arranged around the axle.

8. A bicycle hub according to claim 1, wherein a centering device is provided being arranged perpendicularly to the longitudinal direction of the axle and guiding said second part.

9. A bicycle hub according to claim 8, wherein said centering device is provided next to said adjustable stopper mechanism.

10. A bicycle hub according to claim 9, wherein said centering device comprises a hole extending perpendicularly through said axle, and said adjustable stopper mechanism comprises an elongated hole, wherein the longitudinal axes of said holes are in parallel to each other.

11. A bicycle hub according to claim 9, wherein said centering device comprises a hole extending perpendicularly through said axle, and said adjustable stopper mechanism comprises an elongated hole, wherein the longitudinal axes of said holes are arranged perpendicularly to each other.

12. A bicycle comprising a bicycle hub, comprising:
an axle,
a first part being seated on said axle and being provided with or connected to a cog,
a second part being movable relative to said first part in longitudinal and rotational direction of said axle,
said first and said second part being in contact with each other via a screw coupling provided by threads,
a hub body being arranged around at least said second part,
said second part being provided with a first cone surface,
said hub body having a second cone surface formed thereon or connected thereto, wherein said two cone surfaces are engageable for power transmission,
wherein an adjustable stopper mechanism is provided, limiting a gap providing space for an axial movement of said second part,
wherein said stopper mechanism comprises a positioning element, said positioning element being movable in axial direction of said axle for the purpose of adjusting said gap, and
wherein said positioning element is seated within the axle and can be accessed from at least one open end of the axle.

13. A bicycle according to claim 12, wherein said positioning element is fixed within said axle by at least one screw being screwed into one end portion of said axle.

14. A bicycle according to claim 12, wherein said stopper mechanism comprises an element extending perpendicularly through an opening within the axle.

15. A bicycle according to claim 14, wherein said opening within the axle is an elongated hole such that the element extending perpendicularly through said elongated hole can move in the longitudinal direction of the axle.

16. A bicycle hub comprising:
an axle,
a first part being seated on said axle and being provided with or connected to a cog,
a second part being movable relative to said first part in longitudinal and rotational direction of said axle,
said first and said second part being in contact with each other via a screw coupling provided by threads,
a hub body being arranged around at least said second part,
said second part being provided with a first cone surface,
said hub body having a second cone surface formed thereon or connected thereto, wherein said two cone surfaces are engageable for power transmission,
wherein an adjustable stopper mechanism is provided, limiting a gap providing space for an axial movement of said second part, and
wherein said stopper mechanism comprises an element extending perpendicularly through an opening within the axle.

17. A bicycle hub according to claim 16, wherein said opening within the axle is an elongated hole such that the element extending perpendicularly through said elongated hole can move in the longitudinal direction of the axle.

18. A bicycle hub according to claim 16, wherein said element extending perpendicularly through said opening within the axle is seated with its ends in a ring being arranged around the axle.

19. A bicycle hub according to claim 17, wherein said element extending perpendicularly through said opening within the axle is seated with its ends in a ring being arranged around the axle.

20. A bicycle hub according to claim 19, wherein said element extending perpendicularly through said opening within the axle is provided with threads and screwed with its ends in corresponding threads being provided in two opposing walls of said ring being arranged around the axle.

* * * * *